(12) United States Patent
Falkenhahn et al.

(10) Patent No.: US 12,535,089 B2
(45) Date of Patent: Jan. 27, 2026

(54) PNEUMATIC SYSTEM AND PROCESS (71) Applicant: Festo SE & Co. KG, Esslingen (DE)

(72) Inventors: Valentin Falkenhahn, Neulußheim (DE); Daniel Klassen, Esslingen (DE); Thilo Balbach, Esslingen (DE); Clemens Fabig, Denkendorf (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 18/819,558

(22) Filed: Aug. 29, 2024

(65) Prior Publication Data

US 2025/0075712 A1 Mar. 6, 2025

(30) Foreign Application Priority Data

Aug. 31, 2023 (DE) ..................... 10 2023 123 456.0

(51) Int. Cl.
*F15B 13/08* (2006.01)
*F15B 11/00* (2006.01)

(52) U.S. Cl.
CPC ........ *F15B 13/0839* (2013.01); *F15B 11/006* (2013.01); *F15B 13/0832* (2013.01); *F15B 13/086* (2013.01); *F15B 2211/30565* (2013.01); *F15B 2211/30575* (2013.01); *F15B 2211/6656* (2013.01)

(58) Field of Classification Search
CPC ................ F15B 11/006; F15B 13/0832; F15B 13/0839; F15B 2211/6656; F15B 2211/30565; F15B 2211/30575
See application file for complete search history.

(56) References Cited

U.S. PATENT DOCUMENTS

| | | | |
|---|---|---|---|
| 10,774,857 B2 * | 9/2020 | Neumann | F15B 11/064 |
| 2019/0136880 A1 | 5/2019 | Neumann et al. | |
| 2020/0309167 A1 * | 10/2020 | Klassen | F15B 21/087 |
| 2021/0324879 A1 * | 10/2021 | Klassen | F15B 11/048 |

(Continued)

FOREIGN PATENT DOCUMENTS

| | | |
|---|---|---|
| DE | 10 2005 041 510 | 3/2007 |
| DE | 10 2016 206 821 | 10/2017 |

(Continued)

OTHER PUBLICATIONS

Office Action issued in corresponding German Patent Application No. 10 2023 123 456.0, Apr. 25, 2024, 5 pages.

*Primary Examiner* — Thomas E Lazo
(74) *Attorney, Agent, or Firm* — HSML P.C.

(57) ABSTRACT

A pneumatic system, including a valve arrangement with a carrier section and several valve modules which are arranged in or on the carrier section, in which each valve module includes at least one valve unit and in which the carrier section comprises a plurality of working ports. Each working port can be selectively pressurised or exhausted via a respectively assigned valve unit. The pneumatic system further includes a hose arrangement and at least one pneumatic consumer with a compressed air receiving space which via the hose arrangement is pneumatically connected to at least two of the working ports, so that by way of this the valve units which are assigned to these working ports are pneumatically interconnected and the compressed air receiving space can be simultaneously pressurised and/or exhausted via at least these two interconnected valve units.

12 Claims, 3 Drawing Sheets

(56) References Cited

U.S. PATENT DOCUMENTS

| | | | | |
|---|---|---|---|---|
| 2021/0356975 A1* | 11/2021 | Patz | ................... | F15B 13/0817 |
| 2022/0100155 A1* | 3/2022 | Vilinski | ............... | G05B 13/029 |
| 2023/0185318 A1* | 6/2023 | Wahl | .................... | F15B 21/087 |
| | | | | 700/282 |

FOREIGN PATENT DOCUMENTS

| DE | 10 2019 217 068 | 5/2021 |
|---|---|---|
| DE | 10 2020 212 296 | 3/2022 |

* cited by examiner

PNEUMATIC SYSTEM AND PROCESS

The invention relates to a pneumatic system, comprising a valve arrangement with a carrier section and several valve modules which are arranged in or on the carrier section, wherein each valve module comprises at least one valve unit and wherein the carrier section comprises a plurality of working ports, wherein each working port can be selectively pressurised or exhausted via a respective assigned valve unit, wherein the pneumatic system further comprises a hose arrangement and at least one pneumatic consumer with a compressed air receiving space. The pneumatic consumer is for example a pneumatic drive cylinder and the compressed air receiving space is for example a pressure chamber.

SUMMARY

An object of the invention lies in permitting the pressurising or exhausting of the compressed air receiving space with a greater throughput of compressed air, in an efficient manner.

The object is achieved by a pneumatic system as discussed herein. The pneumatic consumer is pneumatically connected to at least two of the working ports via a hose arrangement, so that by way of this the valve units which are assigned to these working ports are pneumatically interconnected and the compressed air receiving space can be simultaneously pressurised and/or exhausted via at least these two interconnected valve units.

What is meant by the term "pressurising" is the feeding of compressed air and by the term "exhausting" the discharging of compressed air.

The maximal compressed air throughput which is available at a working port for pressurising or exhausting in particular is limited by the design of the respectively assigned valve unit. In order to permit a greater pressurised air throughput at a working port, it is conventionally necessary to apply a larger valve module for this working port, said valve module comprising a valve unit which is designed for a greater compressed air throughput. Due to the approach according to the invention, of pneumatically connecting at least two working ports to the same compressed air receiving space, it is possible to pressurise or exhaust the compressed air receiving space with a greater compressed air throughput without having to apply another or larger valve module for this.

What is meant by the wording that the valve units are pneumatically interconnected valve units is that the valve units are pneumatically connected in parallel to one another. A compressed air flow which is provided by a compressed air source divides into several part-flows which flow parallel to one another through the interconnected valve units and parallel to one another through the assigned working ports. Expediently, the part-flows are then led together in the hose arrangement or in the compressed air receiving space. The interconnected valve units can also be denoted as linked valve units and the working ports which are assigned to these interconnected valve units can also be denoted as linked working ports.

On account of pneumatic interconnecting the valve units, the pressurising or exhausting of the compressed air receiving space can preferably be effected with a compressed air throughput which is larger than a maximal possible compressed air throughput of each individual one of the pneumatically interconnected valve units. According to the invention, a physical linking of several working ports of a valve arrangement (in particular of a valve terminal) can be effected for increasing the throughput.

Advantageous further developments are defined in the dependent claims.

The invention further relates to a method for operating the pneumatic system, comprising the step: simultaneous pressurising or exhausting of the compressed air receiving space via the interconnected valve units.

BRIEF DESCRIPTION OF THE DRAWINGS

Further exemplary details as well as exemplary embodiments are explained hereinafter with reference to the figures. Herein are shown in.

DETAILED DESCRIPTION

Figure 1:
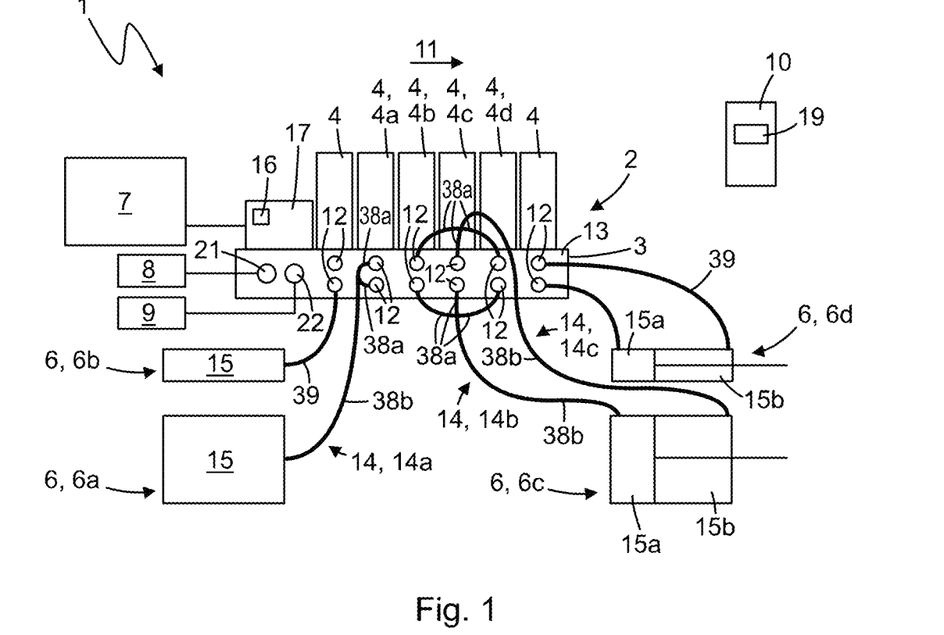
FIG. 1 a schematic representation of a pneumatic system.

FIG. 1 shows a pneumatic system 1 which comprises a valve arrangement 2 and at least one pneumatic consumer 6. By way of example, the pneumatic system 1 comprises four pneumatic consumers 6 which hereinafter are to be denoted as the first consumer 6a, second consumer 6b, third consumer 6c and fourth consumer 6d. The terms "first", "second", etc. are to serve for the termed differentiation of the consumers 6 and in particular not as a detail as to how many consumers 6 are present. Each of the consumers 6 can also be present without the other consumers 6.

Preferably, the pneumatic system 1 comprises a control device 7 which in particular is designed as a super-ordinate control, for example as a PLC (programmable logic controller), a compressed air source 8, a compressed air sink 9 and/or a user device 10. The pneumatic system 1 further comprises at least one hose arrangement 14.

The pneumatic system 1 is an exemplary application environment for the valve arrangement 2. The valve arrangement 2 can also be provided on its own-thus in particular without the further components of the pneumatic system 1.

The valve arrangement 2 comprises a carrier section 3 and several valve modules 4 which by way of example are arranged on the carrier section 3. According to an alternative design, the valve modules can be arranged in the carrier section. The carrier section 3 by way of example is designed in a plate-like manner and in particular comprises an upwardly directed equipping side, on which the valve modules 4 are attached. The valve modules 4 are preferably designed in a plate-like manner and are expediently arranged next to one another in a rowing direction 11. The rowing direction 11 expediently runs normally to the plate plane of the valve modules 4. Each valve module 4 comprises at least one valve unit 5. By way of example, each valve module 4 comprises two valve units 5, in particular exactly two valve units 5.

The carrier section 3 comprises a plurality of working ports 12. By way of example, the working ports 12 are arranged on a connection side 13 of the carrier section 3. The connection side 13 in particular is aligned orthogonally to the equipping side. The working ports 12 are expediently designed as openings, in particular as round openings, in the connection side 13. By way of example, the working ports 12 form two working port rows which by way of example are arranged above one another. By way of example, precisely two working ports 12 are assigned to each valve module 5. Expediently, precisely one valve element 5 is assigned to each working port 12, so that expediently a 1:1 assignment exists between the working ports 12 and the valve units 5.

Each working port 12 can be selectively pressurised or exhausted via the respectively assigned valve element 5. What is meant by the wording that a valve unit 5 is assigned to a working port 12 is that compressed air can be fed to the working port 12 or discharged from the working port 12 (in particular exclusively) via this valve unit 5. Compressed air can be fed from the compressed air source 8 to the respective working port 12 and/or compressed air can be led away from the respective working port 12 to the compressed air sink 9, via the respectively assigned valve unit 5.

By way of example, the valve arrangement 2, in particular the carrier section 3 comprises a compressed air inlet 21, to which the compressed air source 8 is pneumatically connected. Expediently, the valve arrangement 2, in particular the carrier section 3 comprises a compressed air outlet 22 which is pneumatically connected to the compressed air sink 9. The compressed air sink 9 for example can be the surroundings of the valve arrangement 2.

Figure 2:
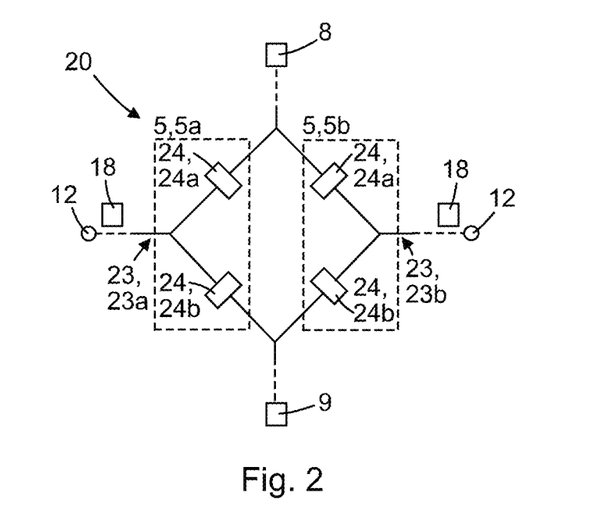
FIG. 2 a schematic representation of a valve device of a valve module.

FIG. 2 shows an exemplary embodiment of a valve device 20. By way of example, each valve module 4 comprises a respective valve device 20. The subsequent explanations which are directed to a valve device 20 expediently also apply to each valve device 20 of the valve arrangement 2. The valve device 20 expediently comprises two valve units 5 which are to be denoted as the first valve unit 5a and the second valve unit 5b. By way of example, the valve device 20 is designed as a pneumatic full bridge and each valve unit 5a, 5b represents a pneumatic half bridge. Each valve unit 5 comprises a respective valve unit outlet 23 with which the valve unit 5 is pneumatically connected to the respectively assigned working port 12, for example via a respective pneumatic conduit which runs through the carrier section 3. The first valve unit 5 comprises a first valve unit outlet 23a and the second valve unit 5 comprises a second valve unit outlet 23b.

Each valve unit 5 is in the position of selectively pressurising or exhausting the working port 12 which is assigned to it. By way of example, each valve unit 5 comprises two respective valves 24 which are also to be denoted as a first valve 24a (or pressurising valve 24a) and second valve 24b (or exhausting valve 24b). The valves 24 are designed for example as 2/2-way valves-Preferably, the valves 24 are designed as piezovalves. In particular, the valves 24 are designed as proportional valves. Concerning each valve 24, expediently a throughput cross section can be freely set between a closed state and a maximally open state, in particular by way of a control signal 28 which is fed to the respective valve unit 5. Each first valve 24a is connected between the compressed air source 8 and the respective valve unit outlet 23 and expediently serves for setting a compressed air throughput from the compressed air source 8 to the respective working port 12 which is connected to the respective valve unit outlet 23. Each second valve 24b is connected between the compressed air sink 9 and the respective valve unit outlet 23 and expediently serves for setting a compressed air throughput from the respective working port 12 which is connected to the respective valve unit exit 23, to the compressed air sink 9.

The valve arrangement 2 preferably comprises a plurality of valve units 5. Each valve unit 5 can expediently be selectively pressurised or exhausted (independently of the other valve units 5).

Preferably, the pneumatic system 1 comprises a plurality of sensor units 18. By way of example, a respective sensor unit 18 is assigned to each valve unit 5. For example, each sensor unit 18 is designed as a pressure sensor and in particular serves for detecting the compressed air pressure which prevails at the respectively assigned working port 12. The sensor units 18 are preferably arranged in the carrier section 3. Moreover, the sensor units 18 can be arranged in the valve modules 4.

The pneumatic system 1 comprises the at least one hose arrangement 14. By way of example, the pneumatic system 1 comprises three hose arrangements 14 which hereinafter are to be denoted as the first hose arrangement 14a, the second hose arrangement 14b and the third hose arrangement 14c.

The at least one pneumatic consumer 6 comprises a compressed air receiving space 15 which is preferably designed as a pressure chamber. By way of example, each of the pneumatic consumers 6a, 6b, 6c, 6d comprises (at least one) respective compressed air receiving space 15 which in particular is designed as a pressure chamber. By way of example, at least one pneumatic consumer 6 is designed as a pneumatic drive cylinder and expediently comprises a first compressed air receiving space 15a which is designed as a first pressure chamber and a second compressed air receiving space 15b which is designed as a second pressure chamber. In the shown example, the third pneumatic consumer 6c and the fourth pneumatic consumer 6d are each designed as a pneumatic drive cylinder. Optionally, the first pneumatic consumer 6a and/or the second pneumatic consumer 6b can be designed as a pneumatic drive cylinder.

At least one pneumatic consumer 6 is pneumatically connected to at least two of the working ports 12 via at least one hose arrangement 14. Expediently, by way of this, the valve units 5 which are assigned to these working ports 12 are pneumatically interconnected and the compressed air receiving space 15 of the at least one pneumatic consumer 6 can be simultaneously pressurised and/or exhausted via at least these two interconnected valve units 5. The interconnected valve units 5 can comprise valve units 5 of the same valve module 4 and/or valve units 5 of different valve modules 4. In each case, it is those valve units 5 which are pneumatically connected to the same compressed air receiving space 15 which are to be denoted as interconnected valve units 5. The valve units 5 which are pneumatically connected to the same compressed air receiving space 15 can also be denoted as a valve unit group. The pneumatically interconnected valve units 5 are expediently connected in parallel to one another.

In the shown example, the compressed air receiving space 15 of the first pneumatic consumer 6a is connected via the first hose arrangement 14 to two working ports 12 which by way of example are assigned to both valve units 5 of the same valve module 4—here of a first valve module 4a. Furthermore, by way of example, the first compressed air receiving space 15a of the third pneumatic consumer 6c is pneumatically connected via the second hose arrangement 14b to three working ports 12 which by way of example are assigned to valve units 5 of different valve modules 4—here by way of example of a second valve module 4b, of a third valve module 4c and of a fourth valve module 4d. Moreover, by way of example, the second compressed air receiving space 15b of the third pneumatic consumer 6c is pneumatically connected via the third hose arrangement 14 to three working ports 12 which by way of example are assigned to valve units 5 of different valve modules 4—here by way of example of the second valve module 4b, the third valve module 4a and of the fourth valve module 4d.

Expediently, each working part 12 is pneumatically connected maximally to a single respective compressed air receiving space 15.

The first hose arrangement 14a by way of example comprises two first hose sections 38a which are each connected to a respective working port 12. The first hose arrangement 14 further comprises a second hose section 38b which is connected to the two first hose sections 38a in particular in a manner such that separately led part-flows are led together in the first hose sections 38a into a compressed air flow which flows in the second hose section 38b. For example the first hose arrangement has a Y-shape.

The second hose arrangement 14b by way of example comprises three first hose sections 38a which are each connected onto a respective working port 12. The second hose arrangement 14b further comprises a second hose section 38b which is connected to the three first hose sections 38a, in particular in a manner such that part-flows which are led separately in the first hose sections 38a are led together into a compressed air flow which flows in the second hose section 38b. The third hose arrangement 14c is designed as the second hose arrangement 14b.

By way of example, the second consumer 6b and the fourth consumer 6d are connected to the valve arrangement 2 in a conventional manner-thus without connecting together several valve units 5. By way of example, the compressed air receiving space 15 of the second consumer 6b is pneumatically connected to (only) a single working port 12 via a single hose 39. In a similar manner, the compressed air receiving spaces 15a, 15b of the fourth consumer 6d are each pneumatically connected to in each case (only) a single working port 12 each via a respective single hose 39.

Inasmuch as one refers to the valve units 5, in particular interconnected valve units 5 in the subsequent explanations, what are particularly meant herewith are the valve units 5 which are pneumatically connected to the compressed air receiving space 15 of the first consumer 6a. Furthermore, the subsequent explanations accordingly apply to the case in which more than two valve units 5 are interconnected, thus in which for example three valve units 5 are interconnected, as is the case with respect to the third consumer 6c.

Preferably, the pneumatic system 1 comprises a control unit 16 which by way of example is part of the valve arrangement 2. For example, the control unit 16 is arranged in a control section 17 of the valve arrangement 2. The control section 17 is arranged for example on the carrier section 36 or part of the carrier section 3. According to an alternative embodiment, the control unit 16 can also be provided separately from the valve arrangement 2, for example as an external control. Furthermore, the control unit 16 can be implemented on the control device 7. The control unit 16 is designed to generate control signals 28 for controlling the valve units 5. In particular, the control unit 16 is designed to generate the control signals for controlling the valve units 5 such that by way of this the simultaneous pressurising or simultaneous exhausting is effected by way of the at least two (or three) interconnected valve units 5.

Preferably, the control unit 16 comprises connection information which indicates that the at least two (or three) valve units 5 are interconnected. For example, it is stored in the connection information as to which valve units 5 are interconnected into a respective valve unit group. By way of example, the connection information indicates that the two valve units 5a, 5b of the first valve module 4a are interconnected into a (first) valve unit group, that the second valve units 5b of the second valve module 4b, of the third valve module 4c and of the fourth valve module 4d are interconnected into a (second) valve unit group, and/or that the first valve units 5a of the second valve module 4b, of the third valve module 4c and of the fourth valve module 4d are interconnected into a (third) valve unit group.

Preferably, the control unit 16 is designed to take into account the connection information on generating the control signals 28, in particular in a manner such that a pressurising or exhausting is effected by way of all valve units 5 which belong to the same valve unit group.

The control unit 16 is expediently designed to carry out at least one application and in the course of the application to generate the control signals 28 for the control of the interconnected valve units 5. The application comprises for example a pressure closed-loop control function, a throttle function, a mass flow function and/or a servo positioning function.

For example, the control unit 16 implements a pressure closed-loop control application in order to closed-loop control the pressure in the respective compressed air receiving space to a pressure setpoint. By way of example, the control unit 16 implements the pressure closed-loop control application with respect to the first consumer 6a and/or the second consumer 6b. For example, the control unit 16 implements a cylinder application (in particular with servo positioning), in order to closed-loop control a respective piston of a respective drive cylinder to a position setpoint. By way of example, the control unit 16 implements the cylinder application with respect to the third consumer 6c and/or the fourth consumer 6d.

Preferably, the control unit 16 is designed, per application, to compute the control signals 28 for the interconnected valve units 5 which are assigned to the application, according to a computation regulation, wherein the computation regulation expediently comprises a rule for processing the sensor signals 35 of several sensor units 18 and/or a rule for distributing the compressed air throughput onto the interconnected valve units 5.

Figure 3:
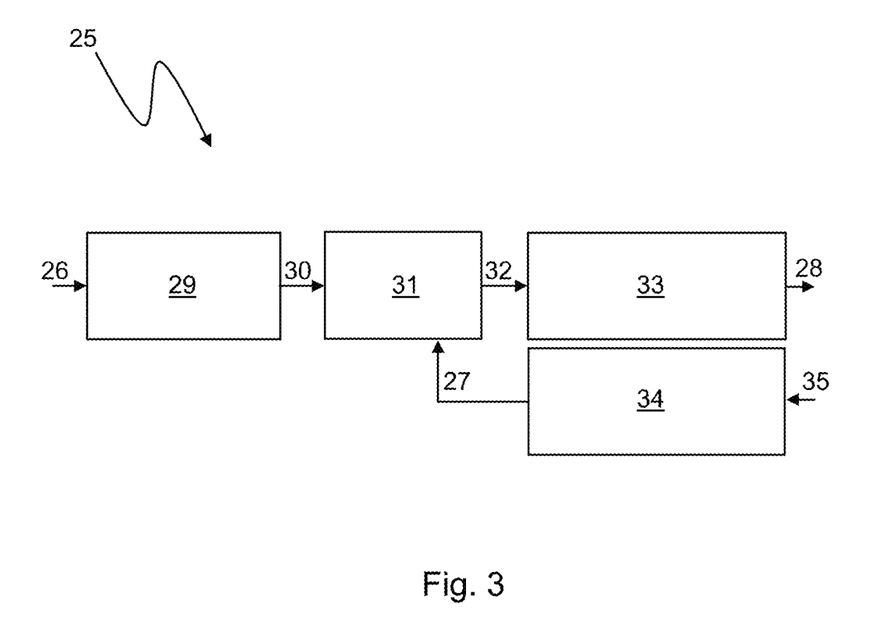
FIG. 3 a block diagram of a controller.

FIG. 3 shows an exemplary design of a controller 25. The controller 25 is in particular a closed-loop controller. For example, it is the control unit 16 which comprises the controller 25, For example, the controller 25 is a program which is carried out by the control unit 16. For example, the computation regulation which is mentioned above is realised by the controller 25. The controller 25 is designed to generate one or more control signals 28 on the basis of a setpoint signal 26 and of an actual value signal 27. The actual value signal 27 can also be denoted as a measurement value signal.

Each control signal 28 serves for controlling a respective valve unit 5. Each control signal by way of example comprises a first valve control signal (for example a first control voltage) for controlling the respective first valve 24a and a second valve control signal (for example a second control voltage) for controlling the respective second valve 24b.

By way of example, the controller 25 comprises a pre-processing unit 29 which is designed to carry out a pre-processing of the setpoint signal 26, in order to generate a pre-processed setpoint signal 30. The pre-processing comprises for example a saturation, a gradient limitation and/or a filter.

By way of example, the controller 25 further comprises a controller unit 31 which in particular is designed as a pressure controller unit. The controller unit 31 is designed to generate a controller signal 32 on the basis of the pre-processed setpoint signal 30 and of the actual value signal 27. For example, the controller unit 31 for generating the controller signal 32 carries out an error computation, a PI closed-loop control or a PID closed-loop control and/or an anti-windup.

By way of example, the controller 25 further comprises an actuation unit 33 which is designed to generate one or two (or three) control signals 28 for one or two (or three) control valve units 5 on the basis of the controller signal 32. The actuation unit 33 in particular serves for controlling piezo-valves and can also be denoted as a piezo-actuation unit. The actuation unit 33 carries out for example a throughput correction and/or a piezo-compensation for generating the one or the two control signals 28. Expediently, the actuation unit 33 comprises an output-splitter for generating two (or three) control signals 28. Optionally, the actuating unit 33 permits a manual control.

By way of example, the controller 25 further comprises a measurement value pre-processing unit 34 which is designed to generate the actual value signal 27 on the basis of one or more sensor signals 35. For example, the measurement value pre-processing unit 34 carries out a signal processing for generating the actual value signal 27 and/or comprises an observer.

As already mentioned above, the pneumatic system 1 preferably comprises a plurality of sensor units 18. Each sensor unit 18 is expediently assigned to a respective valve unit 5 and/or serves for providing a respective sensor signal 35. Preferably, the control unit 16 is designed, on the basis of one or more of the sensor signals 35, to provide the actual value signal 27 and to generate the control signals 28 for the interconnected valve units 5 on the basis of the same actual value signal 27, in particular on the basis of the same actual value of the actual value signal 27. For example, the control unit 16 is designed to provide the actual value signal 27 by way of the control unit 16 selecting a sensor signal 35 from the sensor signals 35 and generating the actual value signal 27, in particular the actual value, on the basis of the selected sensor signal 35 or by way of the control unit computing the actual value signal 27, in particular the actual value, on the basis of the several sensor signals 35. An example of the latter approach is shown in FIG. 4.

Figure 4:
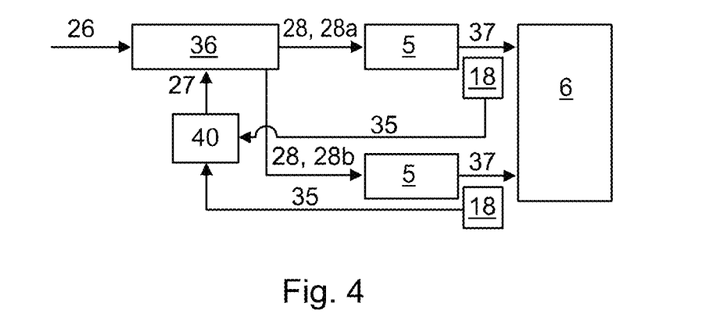
FIG. 4 a block diagram of a control circuit.

FIG. 4 shows a block diagram of a control circuit of a closed-loop control which is expediently carried out by the pneumatic system 1. The control circuit comprises a closed-loop control algorithm 36 which is designed, on the basis of the setpoint signal 26 and the actual value signal 27, to generate several control signals 28 for the interconnected valve units 5, for example a first control signal 28a for one of the interconnected valve units 5 and a second control signal 28b for another of the interconnected valve units 5. Expediently, the closed-loop control algorithm 36 generates a respective control signal 28 for each of the interconnected valve units 5 (of a valve unit group). The closed-loop control algorithm 36 is formed for example by the pre-processing unit 29, the controller unit 31 and the actuation unit 33. According to the respectively received control signal 28, each of the interconnected valve units 5 outputs a respective pneumatic signal 37 to the consumer 6, with which signal the compressed air receiving space 15 of the consumer 6 is pressurised or exhausted.

By way of example, the control circuit comprises a sensor signal processing unit 40 which in particular is designed to reconcile with one another the sensor signals 35 of several sensor units 18 which are assigned to interconnected valve units 5 of the same valve unit group, in particular to amalgamate these, for example by way of forming an average or by way of weighting according to the respective throughout, in order to generate the actual value signal 27 as a result. The sensor signal processing unit 40 is formed for example by the measurement value pre-processing unit 34.

Alternatively, the sensor signal pre-processing unit 40 can be designed to select one of the sensor signals 35 of several sensor units 18 which are assigned to interconnected valve units 5 of the same valve unit group and as an actual value signal 27 to use the selected sensor signal 35 (and expediently not to use the non-selected sensor signals 35, in particular not for the generation of the control signals 28).

Figure 5:
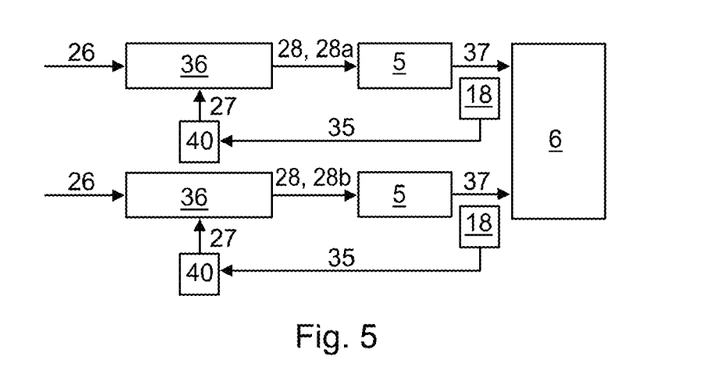
FIG. 5 a block diagram of two control circuits.

FIG. 5 shows an alternative approach, concerning which several control circuits are present—and specifically an individual control circuit for each valve unit 5. An individual closed-loop control algorithm 36 is present for each valve unit 5 of a valve unit group and generates a respective control signal 28 only for this one valve unit 5. Moreover, a respective actual value signal 27 is generated for each control algorithm 36, by way of example by way of a respective sensor signal processing unit 40, on the basis of a respective sensor signal 35.

Different variants as to how the compressed air through-flow can be divided onto the interconnected valve units 5 are to be dealt with hereinafter.

Figure 6:
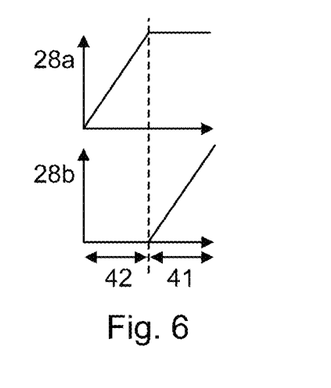
FIG. 6 illustratory pictures of control signals according to a first approach for the control of interconnected valve units, and FIG. 7 illustratory pictures of control signals according to a second approach for controlling interconnected valve units.

The control unit 16 is preferably designed, in a first working region 41, to control the interconnected valve units 5 with the control signals 28 in a manner such that the compressed air receiving space 15 is simultaneously pressurised or exhausted by way of both (or three) interconnected valve units 5, and in a second working region 42 to control the interconnected valve units 5 with the control signals 28 in a manner such that the compressed air receiving space 15 is effected by way of only one of the two (or three) interconnected valve units. The working regions 41, 42 in particular are compressed air throughput regions, expediently related to the compressed air throughput of the compressed air flow which flows out of the compressed air receiving space 15. The first working region 41 comprises larger throughputs than the second working region 42. By way of example, the first working region 41 connects onto the second working region 42 in the direction of an increasing compressed air throughput. In particular, the two working regions 41, 42 do not overlap.

FIG. 6 shows an example of the approach which is explained above. The throughput (of the compressed air flow which flows into or out of the compressed air receiving space 15) is plotted on the horizontal axis. For example, the compressed air throughput which is plotted on the horizontal axis is that compressed air throughput which is demanded by the control unit 16, in particular by an application which runs on the control unit 16. The compressed air throughput which is plotted on the horizontal axis is also to be denoted as the demanded compressed air throughput. The respective control signal 28a, 28b (or the compressed air throughput which is provided by the respective valve unit 5) is plotted on the vertical axis. The upper illustratory picture relates to one of the interconnected valve units and the lower illustratory picture to another of the interconnected valve units (of the same valve unit group). Starting from a throughput starting value (for example zero), the first control signal 28a (or the compressed air throughput which is provided by the one valve element 5) increases in the second working region 42 with an increasingly demanded compressed air throughput, by way of example monotonously, in particular strictly monotonously, preferably linearly. The second control signal 28b (or the compressed air throughput which is provided by the other valve unit 5) remains equal to zero in the second working region 42. The second working region 42 ends and the first working region 41 begins, in a region in which the compressed air throughput of the one valve unit 5 (or the first control signal 28a) reaches its maximum. The transition from the second working region 42 to the first working region 41 can lie precisely at the point in which the compressed air throughput of the one valve unit 5 (or the first control signal 28a) reaches its maximum, or, alternatively, before this point. In the first working region 41, the first control signal 28a (or the compressed air throughput which is provided by the one valve unit 5) remains constant with an increasingly demanded compressed air throughput, whereas the second control signal 28b (or the compressed air throughput which is provided by the other valve unit 5) starting from a throughput starting value (for example zero) rises with an increasingly demanded compressed air throughput, by way of example monotonously, in particular strictly monotonously, preferably linearly.

Figure 7:
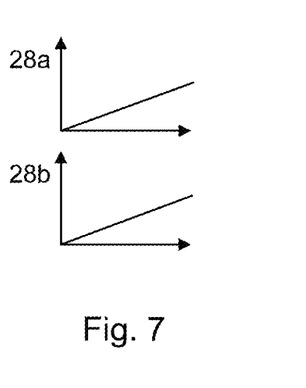

FIG. 7 shows an alternative approach, concerning which the demanded compressed air throughput is equally distributed onto the two control signals 28a, 28b, so that both control signals 28a, 28b have the same course and rise in the same manner, by way of example linearly, given an increasing demanded compressed air throughput.

The control unit 16 is preferably designed to control the interconnected valve units 5 with the control signals 28 in a manner such that one of the interconnected valve units 5 exclusively provides a constant share of a compressed air throughput which occurs on pressurising and/or exhausting the compressed air receiving space 15 and another of the interconnected valve units 5 provides a changing share of the compressed air throughput. For example, the one valve unit 5 provides the constant share so that for this the first control signal 28a is provided with a constant signal value, and the other valve unit 5 provides the changing share of the compressed air throughput, so that the second control signal 28b is provided with a changing signal value for this.

Preferably, the control unit 16 is designed to carry out a detection procedure and in the course of the detection procedure to control the valve units 5 with the control signals 28, in order by way of each valve unit 5 to carry out a respective pressurising and/or exhausting, and on the basis of sensor signals 35 of sensor units 18 assigned to the valve units 5, said sensor signals being detected during each pressurising and/or exhausting, to determine which valve units 5 are pneumatically connected via the hose arrangement 14 to the same compressed air receiving space 15 and to register these valve units 15 as interconnected valve units 5, in particular in the connection information. In this manner, the control unit 16 can carry out an automatic detection of the interconnected valve units 5.

Alternatively or additionally to this, one can also manually input which valve units 5 are interconnected or which valve units 5 belong to the same valve unit group.

For example, the pneumatic system 1 comprises a user interface 19 via which a user can carry out a user input which specifies an assignment of a setpoint signal 26 to a valve unit 5 and or specifies which valve units 5 are interconnected. The user interface 19 by way of example is part of the user device. The user can expediently link the valve units 5 (or working ports 12) with one another in the control unit 16 by way of him assigning the same setpoint signal 26 to several valve units, in particular by way of the user interface 19.

Alternatively to this, the user can directly specify which valve units 5 (or working ports 12) are linked with one another, in particular by way of the user interface 19, and to then optionally assign a setpoint signal to the linked valve units 5 (or working ports 12).

The invention claimed is:

1. A pneumatic system, comprising:
a valve arrangement with a carrier section and several valve modules which are arranged in or on the carrier section,
wherein each valve module comprises at least one valve unit and wherein the carrier section comprises a plurality of working ports, wherein each working port can be selectively pressurised or exhausted via a respectively assigned valve unit;
a hose arrangement; and
at least one pneumatic consumer with a compressed air receiving space which via the hose arrangement is pneumatically connected to at least two of the working ports, so that by way of this the valve units which are assigned to these working ports are pneumatically interconnected and the compressed air receiving space can be simultaneously pressurised and/or exhausted via at least these two interconnected valve units, wherein the compressed air receiving space is a single pressure chamber.

2. The pneumatic system according to claim 1, wherein the pneumatic consumer is a drive cylinder.

3. The pneumatic system according to claim 1, further comprising a control unit which is configured to generate control signals for controlling the valve units, in order to effect the simultaneous pressurising or simultaneous exhausting of the compressed air receiving space by way of the at least two interconnected valve units.

4. The pneumatic system according to claim 3, wherein the control unit comprises connection information which indicates that the at least two valve units are interconnected.

5. The pneumatic system according to claim 3, further comprising a plurality of sensor units, wherein each sensor unit is assigned to a respective valve unit and serves for providing a respective sensor signal, wherein the control unit is configured to provide, on the basis of one or more of the sensor signals, an actual value signal and to generate the control signals for the interconnected valve units on the basis of the same actual value signal.

6. The pneumatic system according to claim 5, wherein the control unit is configured to provide the actual value signal by way of the control unit selecting a sensor signal from the sensor signals and generating the actual value signal on the basis of the selected sensor signal, or by way of the control unit computing the actual value signal on the basis of the several sensor signals.

7. The pneumatic system according to claim 3, wherein the control unit is configured to control, in a first working region, the interconnected valve units with the control signals in a manner such that the compressed air receiving space is simultaneously pressurised or exhausted by way of both interconnected valve units, and to control, in a second working region, the interconnected valve units with the control signals in a manner such that the compressed air receiving space is pressurised or exhausted by way of only one of the two interconnected valve units.

8. The pneumatic system according to claim 3, wherein the control unit is configured to control the interconnected valve units with the control signals in a manner such that one of the interconnected valve units exclusively provides a constant share of a compressed air throughput which occurs on pressurising or exhausting the compressed air receiving space and another of the interconnected valve units provides a changing share of the compressed air throughput.

9. The pneumatic system according to claim 1, further comprising a user interface, via which a user can carry out a user input which specifies an assignment of a setpoint signal to a valve unit and/or specifies which valve units are interconnected.

10. A method for the operation of a pneumatic system according to claim 1, comprising the step: simultaneous pressurising or exhausting of the compressed air receiving space via the interconnected valve units.

11. A pneumatic system, comprising:
a valve arrangement with a carrier section and several valve modules which are arranged in or on the carrier section,
wherein each valve module comprises at least one valve unit and wherein the carrier section comprises a plurality of working ports, wherein each working port can be selectively pressurised or exhausted via a respectively assigned valve unit;
a hose arrangement; and
at least one pneumatic consumer with a compressed air receiving space which via the hose arrangement is pneumatically connected to at least two of the working ports, so that by way of this the valve units which are assigned to these working ports are pneumatically interconnected and the compressed air receiving space can be simultaneously pressurised and/or exhausted via at least these two interconnected valve units,
further comprising a control unit which is configured to generate control signals for controlling the valve units, in order to effect the simultaneous pressurising or simultaneous exhausting of the compressed air receiving space by way of the at least two interconnected valve units, wherein the control unit comprises connection information which indicates that the at least two valve units are interconnected,
wherein the control unit is configured to take into account the connection information on generating the control signals.

12. A pneumatic system, comprising:
a valve arrangement with a carrier section and several valve modules which are arranged in or on the carrier section,
wherein each valve module comprises at least one valve unit and wherein the carrier section comprises a plurality of working ports, wherein each working port can be selectively pressurised or exhausted via a respectively assigned valve unit;
a hose arrangement; and
at least one pneumatic consumer with a compressed air receiving space which via the hose arrangement is pneumatically connected to at least two of the working ports, so that by way of this the valve units which are assigned to these working ports are pneumatically interconnected and the compressed air receiving space can be simultaneously pressurised and/or exhausted via at least these two interconnected valve units, further comprising a control unit which is configured to generate control signals for controlling the valve units, in order to effect the simultaneous pressurising or simultaneous exhausting of the compressed air receiving space by way of the at least two interconnected valve units,
wherein the control unit is configured to carry out a detection procedure and in the course of the detection procedure to control the valve units with the control signals, in order to effect each valve unit into carrying out a respective pressurising and/or exhausting, and on the basis of sensor signals which are detected during each pressurising and/or exhausting, of sensor units which are assigned to the valve units, to determine which valve units are pneumatically connected via the hose arrangement to the same compressed air receiving space and to register these valve units as interconnected valve units.

* * * * *